May 24, 1960  H. G. POOLE  2,937,886
TRACTOR-TRAILER TOWING CONNECTIONS
Filed April 28, 1958  4 Sheets-Sheet 1
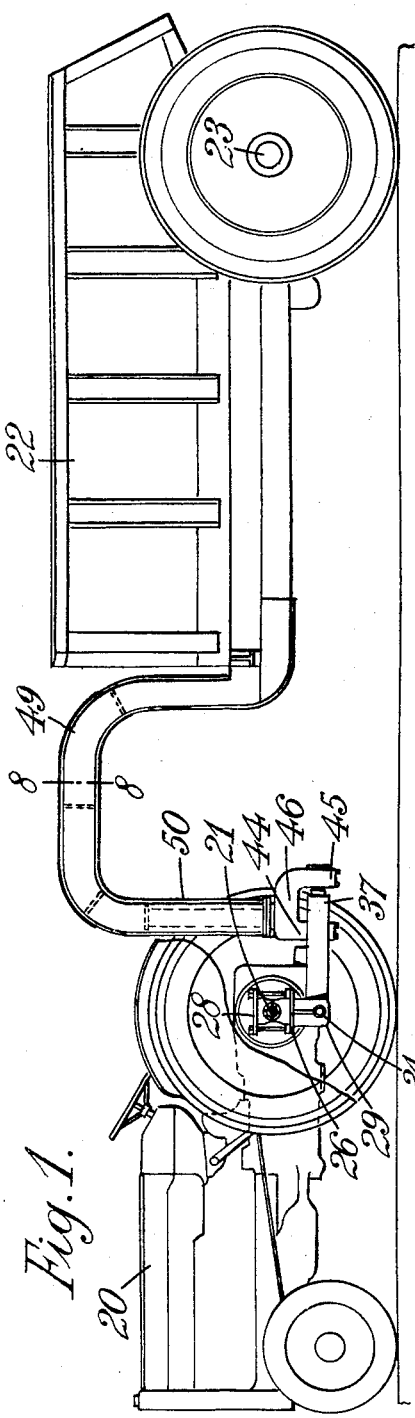
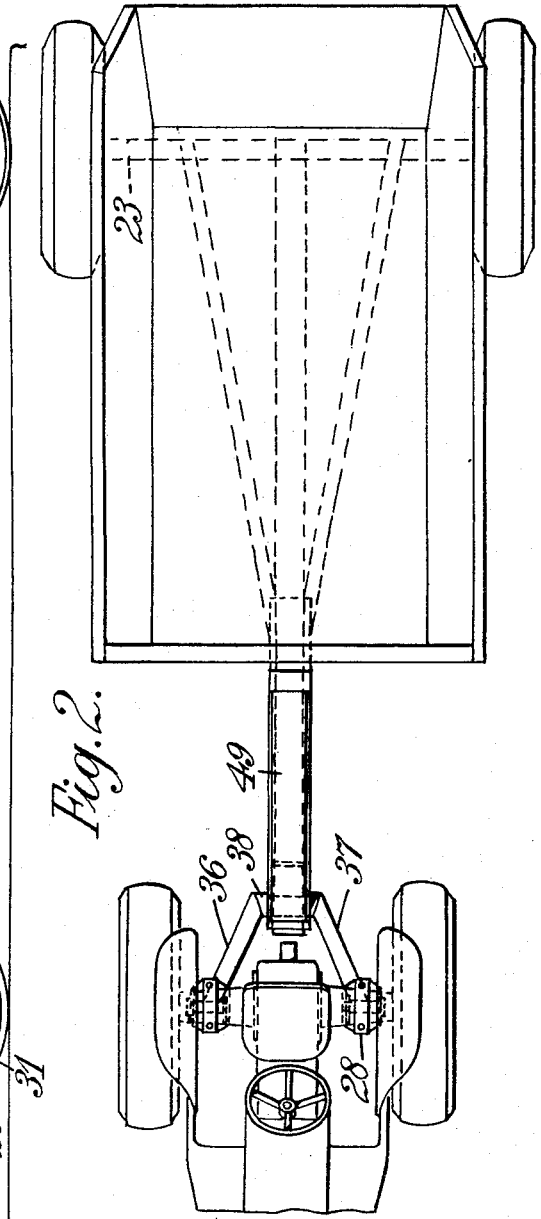
Inventor
Harold George Poole
By
Watson, Cole, Grindle & Watson
Attorneys May 24, 1960    H. G. POOLE    2,937,886
TRACTOR-TRAILER TOWING CONNECTIONS
Filed April 28, 1958    4 Sheets-Sheet 2
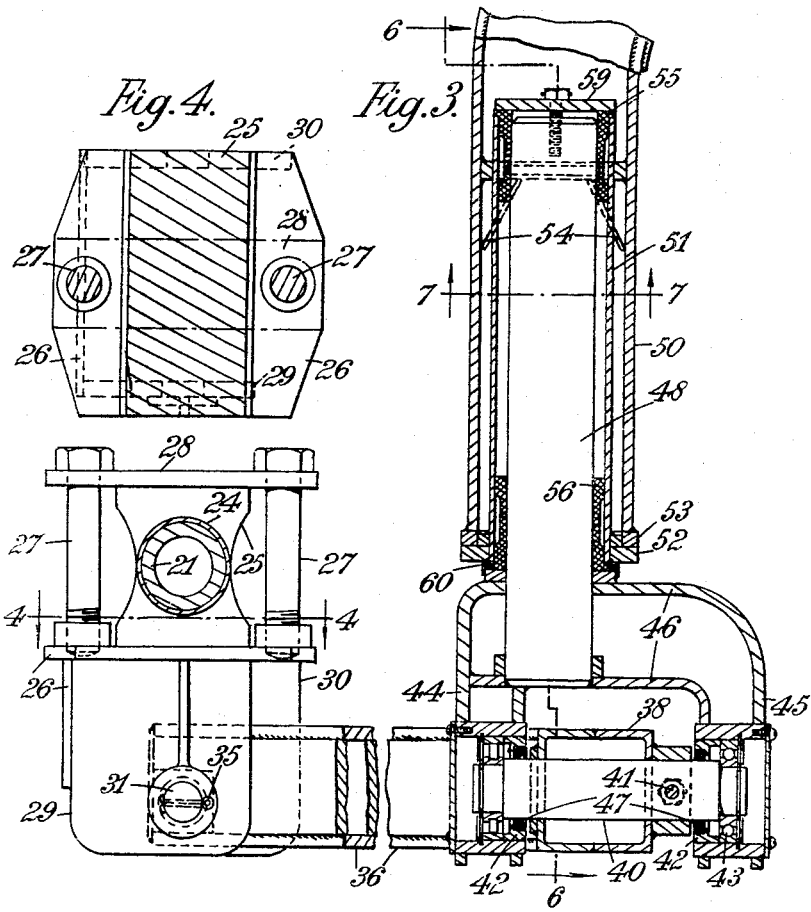
Inventor
Harold George Poole
By
Watson, Cole, Grindle & Watson
Attorneys May 24, 1960  H. G. POOLE  2,937,886
TRACTOR-TRAILER TOWING CONNECTIONS
Filed April 28, 1958  4 Sheets-Sheet 3
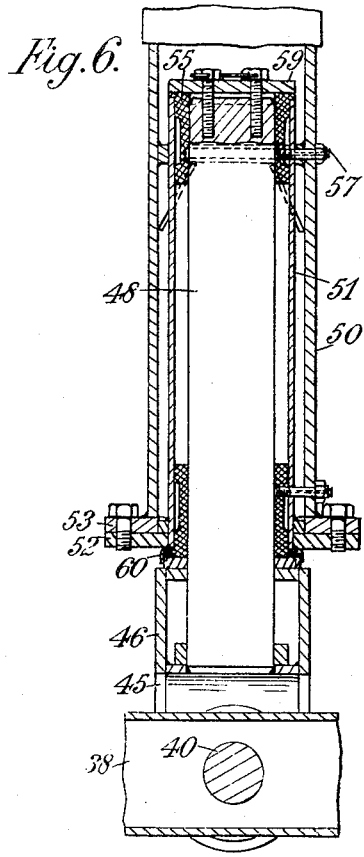
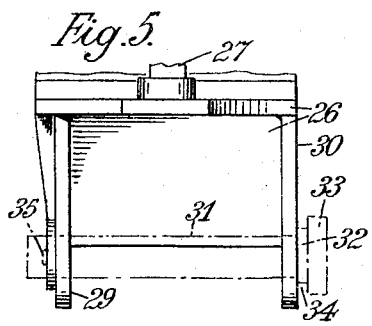
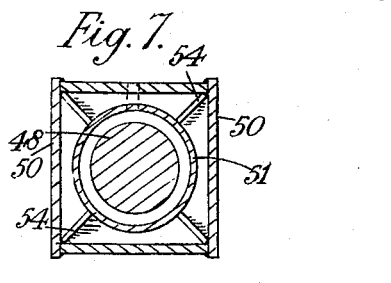
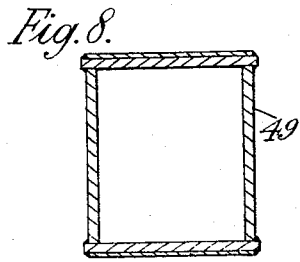
Inventor
Harold George Poole
By
Watson, Cole, Grindle & Watson
Attorneys

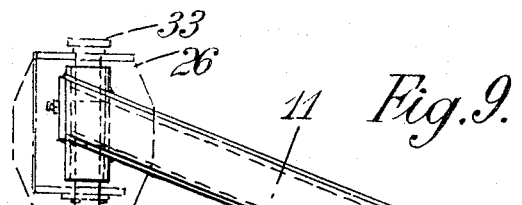
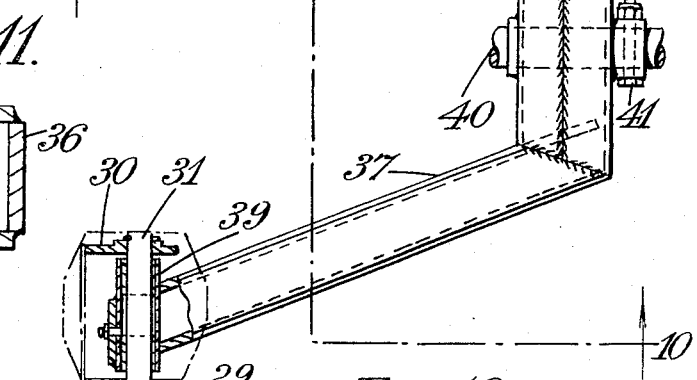
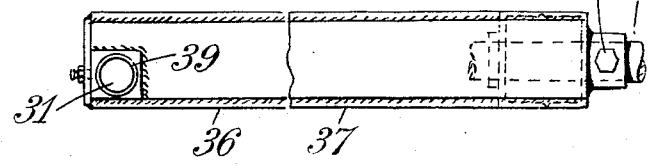
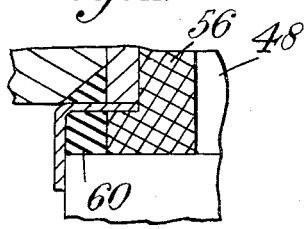
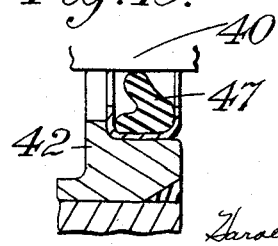

United States Patent Office 2,937,886
Patented May 24, 1960

2,937,886
TRACTOR-TRAILER TOWING CONNECTIONS

Harold George Poole, Farmers Mutual House, Moffat St., Salisbury, Southern Rhodesia Filed Apr. 28, 1958, Ser. No. 731,247

Claims priority, application South Africa May 16, 1957

8 Claims. (Cl. 280—492)

This invention is for improvements in or relating to tractor-trailer towing connections and has for one of its objects to provide an improved form of towing connection which will afford great stability and ground adhesion and will promote manoeuvrability.

It is common practice for a trailer, while being towed by a tractor, to be free to move in various directions in relation to the tractor in order to follow irregularities of the ground and/or to enable the tractor-trailer combination to change direction. It is also common practice for the centre of gravity of the load on a trailer having a single axle or the equivalent thereto to be arranged forward of the said axle so as to enable the tractor to support through the trailer tow-bar a part of the said load.

According to the present invention there is provided a tractor-trailer towing connection comprising in combination a beam which is hinged at its forward end on a support on the tractor, which support is at a level lower than the rear axle of the latter and is directly under or slightly forward of that axle as viewed in plan, and which hinging movement takes place about an axis parallel to the said axle, a tow bar rigidly secured to the trailer, and a connecting member located between the beam and the tow bar, which tow bar has at its forward end a bearing in which a pillar on the connecting member is received so that relative swivelling movement of the tractor and trailer can take place about an upstanding axis, and which connecting member also comprises a shaft located under the pillar and received in a bearing in the rear end of the beam in such manner that relative swivelling movement of the tractor and trailer can take place about an axis which runs in the direction from the front to the rear of the tractor and intersects, or substantially intersects, the upstanding axis of the pillar and the axis of hinging of the beam, all of which parts are arranged in such manner that weight from the trailer is imposed on the support on the tractor through the tow bar, the said shaft and the beam.

In order to achieve a turning circle of small radius, it is known to use a tow bar of goose-neck formation with its forward end downwardly directed. The rear wheels of the tractor will pass under the raised middle part of the goose-neck formation when executing a turn of small radius. In applying such a construction to the present invention, it is preferred to arrange the said downwardly directed forward end of the goose-neck to house in its interior, and afford a bearing to, the upper part of the aforesaid pillar. For this purpose, an upstanding cylindrical sleeve may be secured inside the lower part of the forward end of the goose-neck and be provided in its interior with upper and lower bushes to afford a bearing to the pillar.

It is advantageous to make the aforesaid beam of bifurcated or V formation with the junction of its limbs formed with a bearing for the aforesaid shaft, and with the other extremities of its limbs hingedly received each by a separate support, which supports are close each to one end of the rear axle of the tractor but below the level of the said axle, as specified above.

To facilitate detachment of the beam supports from the rear axle of the tractor, each support may comprise a bracket which is bolted to the underneath of the tractor axle and has two opposed depending walls in which the hinge pin of the beam is carried. Thus by undoing the bolts the support, with the forward end of the beam, may be lowered to the ground. It is however, also advantageous to have the hinge pins endwise detachable from the said walls. This enables the beam to be detached from the tractor without unbolting the supports as just described.

The connecting member mentioned above which is located between the beam and the tow bar, may conveniently have two depending portions in which the ends of the aforesaid shaft are received in bearings, leaving the middle of the length of the shaft free to receive the rear end of the beam.

For a more complete understanding of the invention there will now be described, by way of example only and with reference to the accompanying drawings, one constructional form of towing connection according to the invention. It is to be understood, however, that the invention is not restricted to the precise constructional details set forth.

In these drawings:

Figure 1 is a side elevation of a tractor and trailer coupled by a towing connection according to the present invention, Figure 2 is a plan view of the parts shown in Figure 1, Figure 3 is a side elevation, partly in section, of the principal parts of the towing connection, this figure being on a scale larger than that of Figures 1 and 2, Figure 4 is a section on the line 4—4 of Figure 3, Figure 5 is an end elevation of certain of the parts shown in Figure 4, Figure 6 is a section on the line 6—6 of Figure 3, Figure 7 is a section on the line 7—7 of Figure 3, Figure 8 is a section on the line 8—8 of Figure 1 but on a scale corresponding with that of Figures 3 to 7, Figure 9 is a plan view, partly in section, of the beam and certain associated parts. This figure is on a scale intermediate the scales of Figures 1 and 2 and of Figures 3 to 8 respectively, Figure 10 is a section on the line 10—10 of Figure 9, Figure 11 is a section on the line 11—11 of Figure 9 but on a scale larger than that of Figure 9, and Figures 12 and 13 are enlarged detail sectional views.

Like reference numerals indicate like parts throughout the drawings.

Referring firstly to Figures 1 and 2, the tractor body is indicated at 20 and its rear axle at 21. The trailer body is shown at 22 and this has only a single axle 23, but if desired the trailer could be supported on a bogie having tandem axles, the bogie having only a unitary hinging connection to the body of the trailer so as to leave the latter free to transfer weight at its forward end on to the tractor.

Referring now more particularly to Figures 3, 4 and 5, the rear axle casing of the tractor is shown at 24 and this has webs 25 secured to it to enable fittings to be mounted on the axle casing. The fittings are to receive part of the weight of the trailer 22 and are located near each end of the axle and comprise two brackets 26 which are secured to the under face of the webs 25 by bolts 27 extending upwardly through a co-operating plate 28 above the axle. Each bracket 26 has two opposed parallel depending lateral walls 29 and 30 in which the ends of a hinge pin 31 are carried. As shown more particularly in Figure 5, each of these pins 31 has a double enlargement at one end. The first step 32 of the enlargement is smaller than the second step 33, so that there is a space 34 left between the wall 30 and the adjacent face of the enlargement 33. A detachable securing pin 35 at the other end of the hinge pin 31 serves to maintain the latter in position in the walls 29 and 30, but when the securing pin 35 is removed a tool can be pressed into the space 34 to force the pin 31 to move endwise for dismantling the hinge.

Referring now more particularly to Figures 9 to 11, there is therein shown a bifurcated beam comprising two limbs 36 and 37 and a junction piece 38. The general cross section of the limbs 36 and 37 is shown in Figure 11. Built on to and into the forward extremity of each of the limbs 36 and 37 is a sleeve 39. These sleeves are intended to be received between the walls 29 and 30 of each of the supports depending from the rear axle of the tractor. The hinge pins 31 are co-axially received within the sleeves 39 so that the forward end of the beam is hingedly mounted upon the supports. It will be seen by reference more particularly to Figures 1 and 3 that the hinging axis for the forward end of the beam is at a level lower than the rear axle 21 of the tractor and is directly under that axle as viewed in plan. However, if desired, the brackets 26 may be rearranged so that the hinging axis, while still below the tractor rear axle 21 is slightly forward thereof as viewed in plan.

The junction piece 38 of the beam is formed with a throughway in which a shaft 40 is received. It is held against endwise movement relatively to the beam by a bolt 41. This shaft 40 lies in the direction from the front to the rear of the tractor and its ends reach beyond the junction piece 38 to be received in bearings 42 and 43 mounted in two depending portions 44 and 45 of a member, the upper part 46 of which is connected to the trailer 22. The longitudinal axis of the shaft 40 intersects or substantially intersects the common axis of the hinge pins 31 and the length of the junction piece 38 is such as to permit relative movement about the axis of the shaft 40 between the connecting member 44, 45, 46 and the bifurcated beam. To protect the bearings 42 and 43 from the entry of mud particles and the like, annular packings 47 as shown more particularly in Figure 13 are fitted around the ends of the shaft 40.

Rigidly mounted in the portion 46 of the aforesaid connecting member is a pillar 48 which reaches upwardly to establish connection with a goose-neck tow bar 49 which is rigidly attached to the trailer 22. The axis of the pillar 48 intersects, or substantially intersects, the axis of the shaft 40. The main part of the goose-neck 49 is of rectangular cross-section as shown in Figure 8, but the forward end 50, which reaches downwardly to embrace the pillar 48, is somewhat differently constructed. Referring to Figures 3, 6 and 7 it will be seen that inside the rectangular casing 50 there is secured a sleeve 51 which has at its lower end a flange 52 to be bolted to a co-operating flange 53 at the lower end of the goose-neck. Towards its upper end, the sleeve 51 is centred by gusset plates 54. Within the sleeve 51 and situated one at the upper, and the other at the lower, end of the latter are bushes 55 and 56 which constitute bearings for the pillar 48. The inner surfaces of these bushes can be lubricated through fittings 57 and 58 respectively, shown in Figure 6. To ensure that the bushes 55 and 56 are properly located at the ends of the sleeve 51, each bush is formed with an end flange to overlie the corresponding end of the sleeve. Thus the flange on the bush 56 is engaged by the flange 52 on the sleeve 51 which is bolted to the goose-neck. At the upper end of the pillar 48 there is secured a cap plate 59 which is of such shape and dimensions as to overhang the upper end of the sleeve 51 and clamp the end flange on the bush 55 in place between these two parts. To protect the bearing for the pillar 48 from the entry of mud particles and the like, an annular packing 60 as shown more particularly in Figure 12 is fitted around the flanged end of the bush 56.

From the foregoing it will be appreciated that a proportion of the weight of the trailer 22 is transmitted through the goose-neck 49 to the connecting member 44, 45, 46 and thence through the shaft 40 and the bifurcated beam to the hinging axis which is located below the tractor axle 21. This is accomplished with certainty since the pillar 48 and the shaft 40 in conjunction with the bifurcated beam make a stiff structure for the transmission of this weight. Nevertheless, the tractor and trailer can rise and fall relatively to each other, say when crossing a hump-backed bridge or a ditch, by movement of the bifurcated beam about its hinge pins. The tractor and trailer can move relatively to each other about the axis of the shaft 40 when travelling over uneven ground and causing one or other of the road wheels to rise with respect to its companion at the other end of the axle, and the tractor and trailer can turn about the axis of the pillar 48 when making a change of direction.

The use of the bifurcated beam is advantageous because it enables the load to be equally divided and to be applied close to the tractor rear wheels thus avoiding bending moment on the axle housing.

The term "trailer" herein used is to be understood as covering not only load-carrying vehicles, but also earth-moving scrapers and log-hauling arches and similar implements which can be arranged to impose weight on the support on the tractor in the manner above described.

It is to be understood that the invention is not restricted to the precise constructional details set forth.

I claim:

1. A tractor-trailer towing connection comprising in combination a beam passing underneath the rear axle of the tractor which beam is hinged at its forward end on a support on the tractor, which support is at a level lower than the rear axle of the latter and is disposed at least as far forwardly of the tractor as said rear axle, and which hinging movement takes place about an axis parallel to the said axle, a tow bar rigidly secured to the trailer, and a connecting member located between the beam and the tow bar, which tow bar is of goose-neck formation with its forward end extending substantially vertically downward rearwardly of and to the approximate level of the tractor rear axle, said forward end carrying an elongated vertical bearing structure in which a pillar on the connecting member is received so that relative swivelling movement of the tractor and trailer can take place about an upstanding axis, and which connecting member also comprises a shaft located under the pillar and received in a bearing in the rear end of the beam in such manner that relative swivelling movement of the tractor and trailer can take place about an axis which runs in the direction from the front to the rear of the tractor and substantially intersects the upstanding axis of the pillar and the axis of hinging of the beam, all of which parts are arranged in such manner that weight from the trailer is imposed on the support on the tractor through the tow bar, the said shaft and the beam.

2. A towing connection according to claim 1, in which the beam is of bifurcated formation with the junction of its limbs formed with a bearing for the said shaft and with the other extremities of its limbs hingedly received each by a separate support, which supports are close each to one end of the rear axle of the tractor.

3. A towing connection according to claim 1, in which the support for the forward end of the beam comprises a bracket which is bolted to the underneath of the tractor axle and has two opposed depending walls in which the hinge pin of the beam is carried.

4. A towing connection according to claim 3, in which the hinge pin is endwise detachable from the said walls.

5. A towing connection according to claim 1, in which, below the pillar, the connecting member has two depending portions in which the ends of the said shaft are received in bearings, leaving the middle of the length of the shaft free to receive the rear end of the beam.

6. A towing connection according to claim 1 in which the forward, and downwardly directed, end of the gooseneck houses an upstanding cylindrical sleeve the upper end of which is received in a bearing within said goose-neck and the lower end of which is formed with an out-turned flange whereby it is secured to the lower end of the gooseneck, said cylindrical sleeve having in its interior upper and lower bushes to afford a bearing to the pillar, and at its upper end the sleeve has opposed to it a cap plate secured to the upper end of the pillar and of such a shape and dimensions as to overhang the upper end of the sleeve.

7. A towing connection according to claim 6, in which the said bushes are situated at the ends of the sleeve and are outwardly flanged to overlap the ends of the sleeve and be engaged and maintained in position thereby.

8. A towing connection according to claim 1, said forward end of said goose-neck tow bar being of hollow cross-section and said elongated vertical bearing structure being housed within said forward end of said tow bar.

References Cited in the file of this patent
UNITED STATES PATENTS

| | | |
|---|---|---|
| 1,512,611 | Konetsky | Oct. 21, 1924 |
| 2,091,009 | Osman | Aug. 24, 1937 |
| 2,411,411 | Blair et al. | Nov. 19, 1946 |
| 2,583,191 | Voorhees | Jan. 22, 1952 |
| 2,720,417 | Kling | Oct. 11, 1955 |
| 2,831,737 | Jacoby | Apr. 22, 1958 |